United States Patent Office 2,849,519
Patented Aug. 26, 1958

2,849,519

STORAGE BATTERY PLATES

Clark R. Freas, Philadelphia, and William S. Graff, Wyndmoor, Pa., assignors to The Electric Storage Battery Company, a corporation of New Jersey No Drawing. Application August 3, 1954
Serial No. 447,640

5 Claims. (Cl. 136—20)

The invention relates to improvements in batteries of the alkaline type and particularly to improvements in the methods of making positive plates for such batteries in which the active material for such plates comprises a highly porous matrix of finely divided silver oxide.

According to conventional practice a positive plate for a silver-zinc alkaline battery is made by pasting a slurry of silver oxide and water onto a support or grid, drying, heating to convert the silver oxide to metallic silver. In this condition, the plate is sintered to bond the silver particles, pressed to densify the silver, and anodically electrolyzed to form the active material of silver oxide ($Ag_2O$) or silver peroxide ($Ag_2O_2$). This method is exemplified by United States Patent 2,615,930 granted to J. D. Moulton on October 28, 1952. Although such method has proven eminently satisfactory it is, of course, inherently uneconomical by reason of the conversion of silver oxide into metallic silver and the subsequent reconversion into silver oxide or silver peroxide active material. These steps have, however, heretofore been felt to be necessary to increase the mechanical strength and consequent handleability of the plate. Together with the undesirable economic factors involved in the conversion and reconversion of the active material, we have now determined that these steps actually cause an undue agglomeration of the finely divided silver particles resulting in decreased susceptibility to the charge current thereby requiring lengthy periods of charging at a low current density and decreased performance at high rates of discharge.

It is, therefore, an object of the invention to provide a method of producing positive plates for silver-zinc batteries which is more economical than presently known methods and, at the same time, to provide a plate that is easier to charge and more efficient at high rates of discharge.

In the practice of the invention, the positive plate consists of a screen, wire, or perforated sheet that may be of copper, silver, or other metal, having good electrical conductivity and providing some mechanical support for the active material. The active material is prepared in the form of a paste or slurry of silver oxide and water in the preferred proportions of about 100 grams of silver oxide to about 50 ccs. of water. The mixture is then applied to the screen by any suitable means.

At this stage the plate consists of moist particles of silver oxide weakly cohered together and supported by the screen to an extent that is insufficient to provide handleability during the remainder of the production process. The plate is, therefore, subjected, in accordance with the invention, to temperatures sufficient only to decompose the surface particles to metallic silver and to sinter a thin layer of such particles causing them to adhere together. By such procedure, a sufficient bond will be created between the surface particles to impart mechanical strength to the plate to permit the handling thereof without the loss of active material. The temperatures to which the plate can be subjected to produce this surface sintering effect will vary from about 500° F. to about 600° F. in a roughly inverse relationship to the time during which the temperatures are applied. It will be understood that the desirable time-temperature relationship is one at which surface decomposition to silver and sintering thereof is caused as opposed to one that would produce complete decomposition of silver and sintering together of the whole active mass, a result that would tend to reduce the necessary high porosity of the plate. Accordingly, it has been found that a time period of from about 10 minutes to about 15 minutes will be satisfactory to produce the desired degree of sintering if the temperatures be held within the above mentioned range i. e. about 500° F. to about 600° F.

After the plate is processed as described above it may then be conventionally pressed to produce the desired dimensional tolerances, and, further, to bring the material into firm engagement with the supporting member. In order that the porosity may not be deleteriously affected, the pressures used in this step may be between about 0.5 and about 2.0 tons per square inch of plate surface and preferably about 1.25 tons per square inch.

The active material of the plate may then be formed into silver oxide ($Ag_2O$) or silver peroxide ($Ag_2O_2$) by electrolyzing it against a dummy negative in an alkaline solution. Since the bulk of the material is in the silver oxide state at the start of the formation process an appreciably shorter time period is needed to complete the electrolytic conversion into silver peroxide than has hitherto been the case when formation was started with the material in the metallic silver state. It has been found moreover not merely that the time period for formation has been shortened in this manner but also that appreciably higher current densities can be used, i. e., .07 ampere per square inch of plate surface as compared with .004 ampere per square inch previously used.

The density of charge current that can be used is directly related from the standpoint of efficiency of conversion of the active material to the ability of the plate to accept the charge which in turn is dependent upon the physical state of the active material. The silver oxide used in the past is initially in an extremely finely divided state but when sintered according to the prior art coheres to other particles and agglomerates, thereby decreasing the available amount of particles surface and enhancing the resistance to the subsequent conversion back to silver oxide. According to the invention, however, the bulk of the silver oxide remains in a state of high porosity and thereby presents a large total surface area which permits quick and efficient conversion into silver peroxide under the influence of the charge current. That the active material remains in this finely divided condition is shown by the enhanced capacity of the plate when discharged at high rates in comparison by plates produced by a process including the conventional sintering steps.

It will be seen, therefore, that according to the invention there has been devised a more economical and efficient process for producing positive plates for silver-zinc alkaline batteries as well as improved plates that will show increased capacity over plates heretofore produced by conventional processes. The description hereinbefore set forth is exemplary only of the invention and other forms and variations coming within the scope of the appended claims will occur to those skilled in the art.

What is claimed is:

1. A method of producing positive plates for silver-zinc batteries comprising the steps of preparing a plaque consisting essentially of particles of silver oxide, thermally reducing the outer surfaces only of said plaque to metallic silver particles, whereby said silver particles only are sintered together, and converting substantially all of said metallic silver to a silver oxide.

2. A method of producing positive plates for silver-zinc batteries comprising the steps of preparing a plaque consisting essentially of particles of silver oxide, thermally reducing the outer surfaces only of said plaque to metallic silver particles, whereby said silver particles only are sintered together, pressing said plaque, and converting substantially all of said metallic silver to a silver oxide.

3. A method of producing positive plates for silver-zinc batteries comprising the steps of preparing a plaque consisting essentially of comminuted particles of silver oxide, heating said plaque at not more than about 600° F. to reduce the outer surfaces only of said plaque to metallic silver, pressing said plaque, and electrolyzing substantially all of said metallic silver to a silver oxide.

4. A method of producing positive plates for silver-zinc batteries comprising the steps of preparing a plaque consisting essentially of comminuted particles of silver oxide, heating said plaque at from about 500° F. to about 600° F. to reduce the outer surfaces only of said plaque to metallic silver, pressing said plaque at from about 1 ton to about 10 tons per square inch, and electrolyzing substantially all of said metallic silver to a silver oxide.

5. A positive plate for silver-zinc batteries comprising comminuted particles of a substance selected from the group consisting of silver oxide and silver peroxide, only the particles on the surfaces of said plate being sintered together, and the particles throughout the body of said plate being in a porous and unsintered condition.

References Cited in the file of this patent

UNITED STATES PATENTS

| | | |
|---|---|---|
| 2,594,711 | Andre | Apr. 29, 1952 |
| 2,670,395 | Audubert et al. | Feb. 23, 1954 |
| 2,681,945 | Friedman | June 22, 1954 |
| 2,700,693 | Fischbach | Jan. 25, 1955 |